United States Patent
Ratte

(10) Patent No.: US 6,508,098 B2
(45) Date of Patent: Jan. 21, 2003

(54) FISHING SINKER AND METHOD OF MAKING

(75) Inventor: Geoffrey S. Ratte, Metairie, LA (US)

(73) Assignee: Water Gremlin Company, White Bear Lake, MN (US)

( * ) Notice: Subject to any disclaimer, the term of this patent is extended or adjusted under 35 U.S.C. 154(b) by 0 days.

(21) Appl. No.: 09/873,558

(22) Filed: Jun. 4, 2001

(65) Prior Publication Data

US 2002/0189317 A1 Dec. 19, 2002

(51) Int. Cl.[7] ............................................... B21D 28/00
(52) U.S. Cl. ............................. 72/325; 43/44.89; 7/106
(58) Field of Search .......................... 43/44.89; 72/325, 72/476, 479, 326; 29/817; 7/106; 30/348, 355, 363, 358; 83/682, 684

(56) References Cited

U.S. PATENT DOCUMENTS

| | | | |
|---|---|---|---|
| 4,145,833 A | * 3/1979 | Ratte | 43/44.89 |
| 4,279,092 A | * 7/1981 | Hutson | 43/44.89 |
| 4,796,318 A | * 1/1989 | Bigej | 7/106 |
| 4,944,107 A | * 7/1990 | Wymore | 43/44.89 |

\* cited by examiner

*Primary Examiner*—Allen Ostrager
*Assistant Examiner*—John S Goetz
(74) *Attorney, Agent, or Firm*—Jacobson & Johnson

(57) ABSTRACT

The present invention is directed to a one piece sinker reversibly attachable to a fishing line. The sinker is a streamlined, truncated cone shape having a line accepting passage along the center line thereof. The sinker includes line centering surfaces to prevent line twist as the sinker is drawn though water, and a elongated thumb slot for inserting a tool having a length longer than the sinker to allow a user to manually opening the sinker. Also disclosed is a method of making the sinker employing a unique core blade punch for forming the line accepting passage with the sinker jaws having discontinuous but mateable line engaging surfaces.

9 Claims, 4 Drawing Sheets

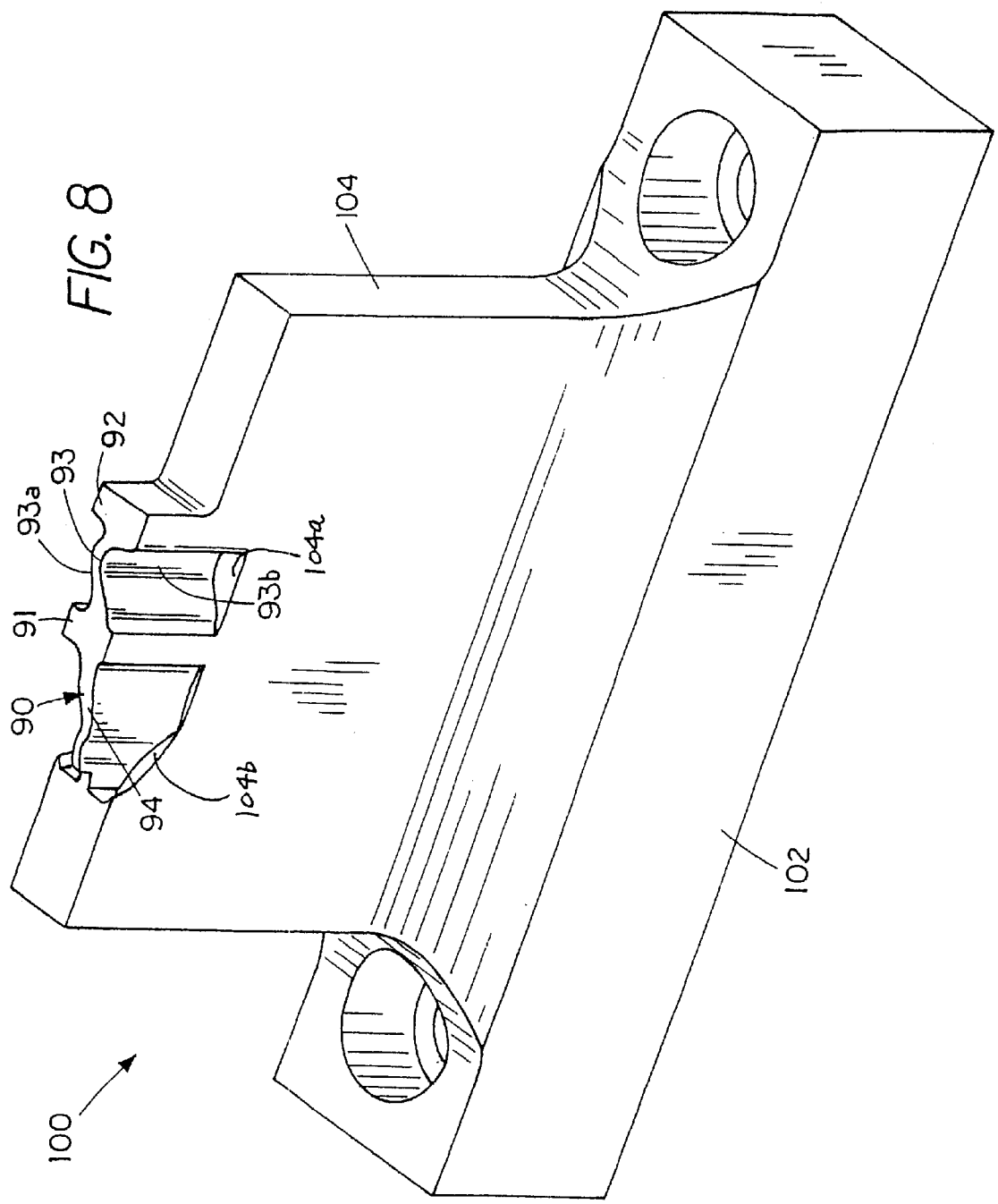

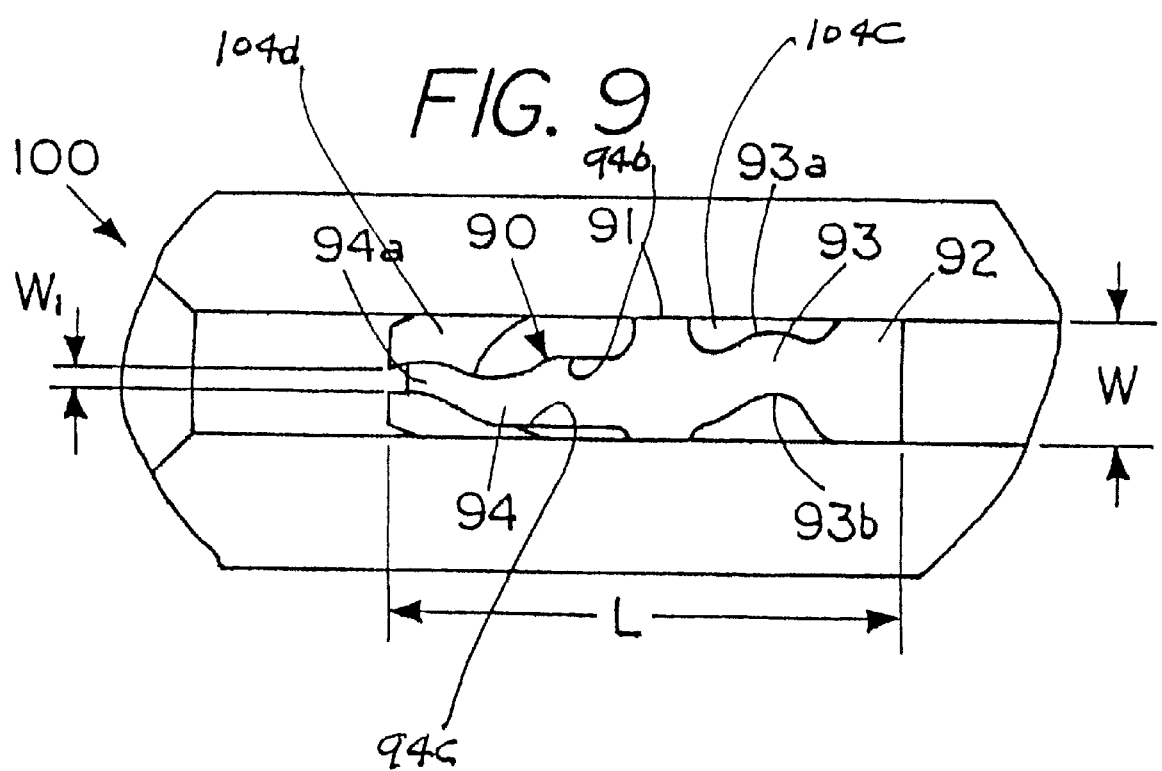

FISHING SINKER AND METHOD OF MAKING

FIELD OF THE INVENTION

The present invention relates generally to sinkers and, more specifically, to a sinker and a method of making a sinker that is easily secured to and safely removed from a fishing line.

BACKGROUND INFORMATION

Fisherman have long used weights or sinkers attached to a fishing line to cause the fishing bait to sink to selected depths in order to catch fish. The weight or sinker also aids the fisherman when casting the bait, particularly lightweight bait, into the water. The present invention comprises an improved sinker and a method of making a sinker that can be held in a fixed line position by mateable line gripping surfaces. In addition, the present invention provides a weight or sinker that is easily attached to fishing line and can be removed from the fishing line without harming the fishing line.

BRIEF DESCRIPTION OF THE PRIOR ART

U.S. Pat. No. 1,618,100 shows a fishing sinker with crevices for looping the fishing line around the sinker.

U.S. Pat. No. 2,753,652 shows a tear shaped fishing sinker where the line is looped around the sinker.

U.S. Pat. No. 2,741,067 shows a snap on sinker with a ring to hold the halves of the sinker in position on the fishing line.

U.S. Pat. No. 3,701,212 shows a salt water sinker with crimpable arms that prevents removal of the sinker from a fishing line.

U.S. Pat. No. 4,145,833 shows a fishing sinker with two halves that can be clamped on a fishing line to hold a line and bait under water.

U.S. Pat. No. 4,279,092 shows a fishing weight having an insert therein for engaging a fishing line.

U.S. Pat. No. 4,459,775 shows a weed-less sinker having nubs on each end of the sinker to fold over the line.

U.S. Pat. No. 4,837,966 shows a cam action fishing sinker device.

U.S. Pat. No. 4,891,903 shows a sliding or fixed fishing sinker where the line can be looped on the sinker to prevent the sinker from sliding.

U.S. Pat. No. 4,944,107 shows a fixed and sliding spherical fishing sinker for attachment to a fishing line by clamping the two halves to the fishing line.

U.S. Pat. No. 4,964,236 shows a fishing line sinker having a quick attachment device.

SUMMARY OF THE INVENTION

The present invention includes a user-friendly removable sinker and a method of making a user friendly one piece sinker which is reversibly attachable to a fishing line. The sinker is composed of finger bendable, non-resilient material. The sinker has first and second ends, with the first end of the sinker smaller than the second end, with the sinker smoothly converging from the second end to the first end to form a streamlined outer truncated, cone shape. The sinker includes first and second jaws separated by a line accepting passage extending from the first end to the second end of the sinker member. The first jaw has a first line gripping surface and a second line gripping surface within the line accepting passage and the second jaw includes first and second line gripping surfaces that are mateable to the line gripping surfaces on the first jaw. The mateable line gripping surfaces produce a nonlinear path through the line accepting passage, so that squeezing together the first and second jaws causes the line gripping surfaces to coact and circumferentially squeeze and maintain the fishing line in the geometric center of the sinker to prevent slippage of the fishing line therein and to minimize the tendency of the sinker to act like a propeller. A tension adjusted peripheral hinge connects the first jaw to the second jaw to maintain the discontinuous first line gripping surface in gripping engagement with the second discontinuous line gripping surface. A relief proximate the line accepting passage that extends the length of the sinker ensures that if the first and second jaw line gripping surfaces are squeezed together one can insert an object larger than the sinker to pry apart the first and second jaw.

BRIEF DESCRIPTION OF THE DRAWINGS

FIG. 8 shows a perspective view of a core blade punch used to form the sinker of the present invention.

FIG. 9 shows a top view of the core blade punch used to make the sinker of the present invention.

DESCRIPTION OF THE EMBODIMENTS

Figure 1:
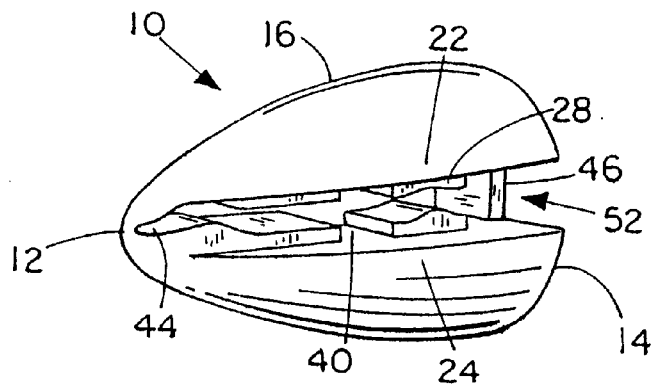
FIG. 1 shows a perspective view of one embodiment of the sinker of the present invention.
Figure 2:
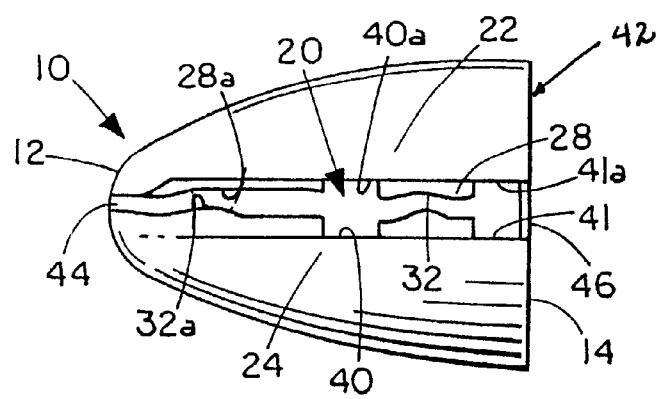
FIG. 2 shows a top view of the sinker of FIG. 1 showing a line accepting passage in an open condition.

FIGS. 1–5, shows a one-piece asymmetrical sinker 10 that reversibly attaches to a fishing line. The sinker 10 is fabricated of finger bendable, non-resilient material, such as soft lead. The sinker 10 has a first rounded end 12 and a second flat or planar end 14, with the first end 12 of the sinker 10 smaller than the second end 14. The sinker 10 has an exterior surface 16 that smoothly converges from the second end 14 to the first end 12 to form a streamlined outer truncated, cone shape. FIG. 2 shows that the exterior surface 42 of the second end 14 of the sinker 10 is flat. The cone shape allows the sinker 10 to be easily drawn through the water and to avoid entanglement with weeds and rocks, when the smaller first end 12 is oriented toward the direction of movement of the fishing line.

Figure 4:
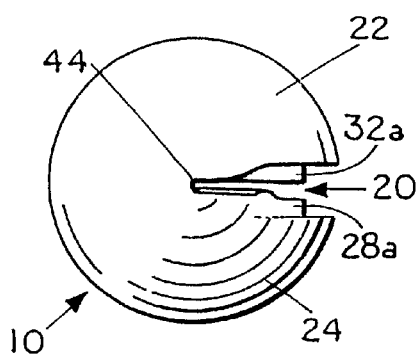
FIG. 4 shows a front view of the sinker of FIG. 1.
Figure 6:
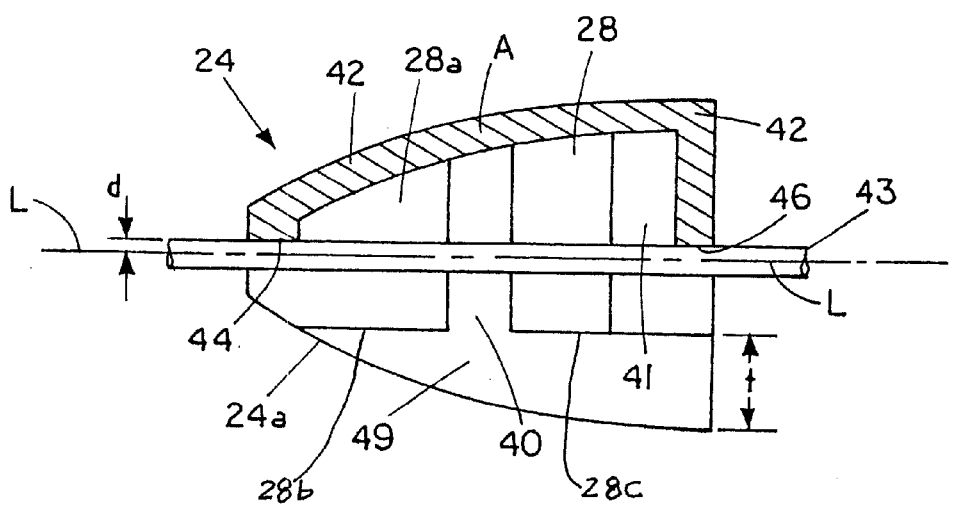
FIG. 6 is a cross sectional view of one half of the sinker showing a peripheral hinge and line gripping surfaces.

FIG. 2 and FIG. 4 shows sinker 10 includes a central line accepting passage 20 extending from the first end 12 to the second end 14 of the sinker 10. A first jaw 22 and a second jaw 24 are separated by the line accepting passage 20. FIG. 6 shows the line accepting passage 20 extends within the sinker 10 to slightly beyond the center line L of the sinker 10 so that a line, such as a fishing line 43, can be centrally positioned within sinker 10 so that the line protrudes centrally from each end of the sinker.

FIG. 2 shows that the first jaw 22 has a set of line gripping surfaces within the line accepting passage 20. The first set of line gripping surface includes a protrusion surface 28 on jaw 22 that can engage a mating surface 32 on jaw 24. FIG. 2 shows that the first jaw 22 has a second set of line gripping surfaces that includes a protrusion 28a on jaw 22 that can engage a mating surface 32a on jaw 24 to provide discontinuous but mateable line engaging surfaces.

In operation the sinker 10 is secured to a fishing line by positioning the line within the line accepting passage 20 and squeezing the jaws 22 and 24 together. The protrusion surface 28 and recess surface 32 coact to squeeze the line therebetween and to produce a nonlinear path through the line accepting passage 20. By circumferentially squeezing and frictionally engaging a fishing line one can maintain the fishing line in the geometric center of the sinker 10 to prevent slippage of the fishing line therein as well as minimizes the tendency of the sinker 10 to act like a propeller when drawn through the water by the fishing line.

Similarly, a second set of line gripping surfaces including protrusion surface 28a and recess surface 32a are brought together as the jaws 22 and 24 are squeeze together to also circumferentially squeeze and frictionally maintain the fishing line in the geometric center of the sinker 10 to prevent slippage of the fishing line therein. Thus with the present embodiment the sinker jaws engage the fishing line at discrete by separate positions along the fishing line to thereby minimize stress at any one point on the line since the jaws engage the fishing line in two discrete positions.

Figure 3:
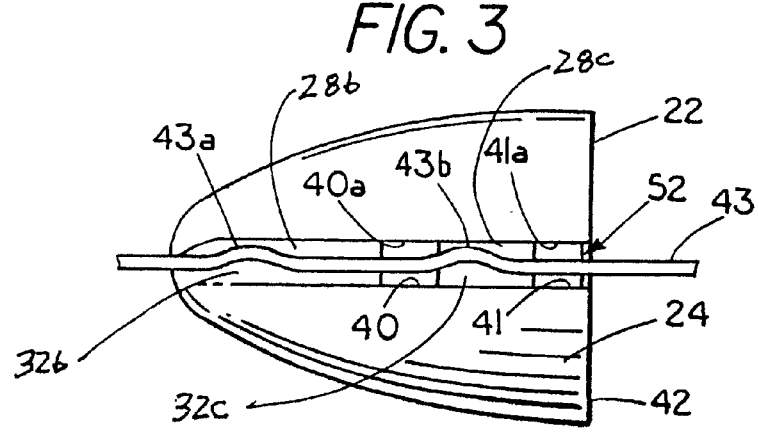
FIG. 3 shows a top view of the sinker of FIG. 2 with the line accepting passage in the closed position.

FIG. 3 shows the sinker 10 with the jaws 22 and 24 in the closed condition. In the closed condition a fishing line 43 extends through the line accepting passage with the fishing line frictional gripped and secured within the sinker. In the closed condition the line follows the junction between the mating surfaces as indicated by node 43a and node 43b in line 43.

Figure 5:
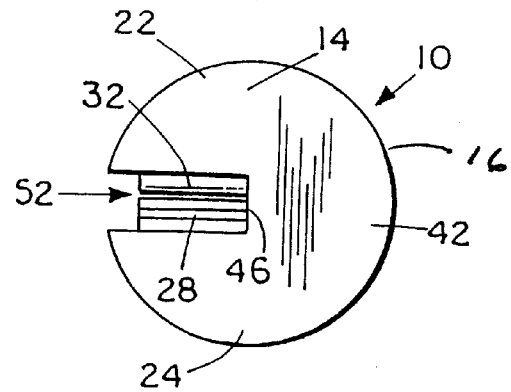
FIG. 5 shows a rear view of the sinker of FIG. 1.

FIG. 5 shows the rearview of the sinker 10 with a portion that extends from the bottom of the line accepting passage 20 to the opposite exterior surface 16 to constitutes a tension adjustable, peripheral hinge 42. The hinge 42 connects the first jaw 22 to the second jaw 24 to maintain the first line gripping surface 28 in gripping engagement with the second line gripping surface 32. The thickness of the hinge 42 controls the ease of movement of the jaws. In the embodiment shown the use of a non-resilient material such as soft lead allows for the entire sinker 10 including the integral hinge to be made from a single piece of material.

Figure 7:
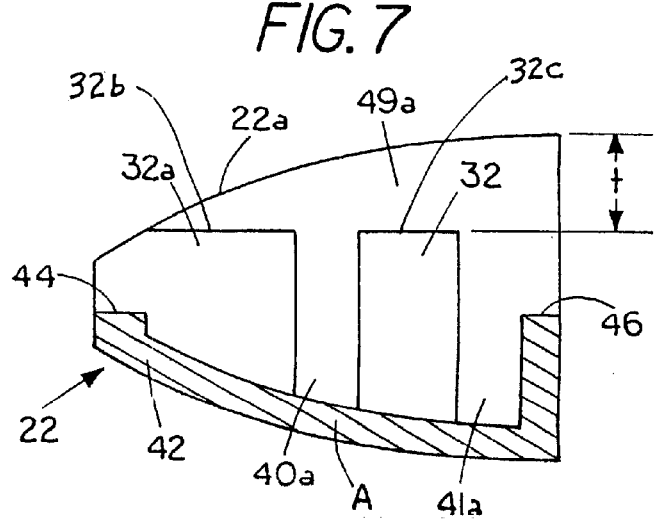
FIG. 7 is a cross sectional view of the opposed half of the sinker showing a peripheral hinge and line gripping surfaces.

FIG. 6 shows a sectional view of one half of sinker 10, and FIG. 7 shows a sectional view of the other half of the sinker 10, with the tension adjusted, peripheral hinge 42 (shown in subsection) for connecting the two jaw 22, 24 together. In order to reveal the interior of the sinker 10 and each of the jaw line gripping surfaces 28, 28a, 32 and 32a, the sinker 10 has been sectioned axially and each half shown in a plane view with the common connecting hinge 42 noted. The line centering surfaces 44, 46 are located on opposite ends of the hinge 42 in order to ensure that the fishing line is maintained along the center line L of the sinker 10. The fishing line 43 is shown positioned along the sinker center line L in FIG. 6.

The use of an integral hinge 42 with a controlled connecting area A, as shown in FIGS. 6 and 7, allows one to preset the tension force necessary to open and close the two halves of the sinker 10 and still maintain a streamlined exterior that prevents twisting. That is, with a larger area A, the sinker 10 is more difficult to open and close, and with a smaller area A, the sinker 10 is less difficult to open and close. Consequently, sinker members of various sizes can be formed that are suitable for fastening to a fishing line without undue finger pressure. In addition, the use of line centering surfaces 44, 46 located on peripheral hinge 42 maintains the fishing line in a centered position within the sinker 10.

FIG. 6 shows a first elongated relief surface 41 that extends transverse to sinker jaw 24 and a second elongated relief surface 40 that is parallel spaced from elongated relief surface 41 with both relief surfaces 40 and 41 terminating in a common surface 49. Similarly FIG. 7 shows a first elongated relief surface 41a that extends transverse to sinker jaw 22 and a second elongated relief surface 40a that is parallel spaced from elongated relief surface 41a with both relief surfaces terminating in a common surface 49a.

FIG. 6 shows mating surface 28 and mating surface 28a are positioned in a spaced apart condition in jaw 24 to engage one side of a fishing line and FIG. 7 shows mating surfaces 32a and 32 are positioned in a spaced apart condition in jaw 22 to engage the opposite side of fishing line 43. Each of the mating surfaces extend upward past the center line L of the fishing sinker but terminate prior to the outside edge 24a of jaw 24 and the outside edge 22a of jaw 22 with both terminating at a distance denoted by "t". The purpose of having the mating surfaces terminate at a distance from the outside edge is to create an elongate finger relief region 52 between jaw 22 and jaw 24 which is more clearly shown by reference to FIG. 5. By having a finger relief region 52 proximate the line accepting passage extending the length of the sinker 10 allows the sinker jaws to be pried apart, such that when the first and second jaw 22, 24 are squeezed together. That is, the finger relief region 52 maintains an opening which allows one to insert either fingernails or a knife blade. Even though the knife blade is longer than the sinker the knife blade can still be inserted between the jaws to pry apart the first and second jaw 22, 24 and free a fishing line from the line accepting passage 20. A further benefit of having the line gripping surfaces 28, 28a, 32 and 32a terminate at the relief region is if a knife blade or the like is used to pry apart the jaws the top of the line gripping surfaces the top of undulating surfaces form a stop to prevent the cutting edge of the knife blade from coming into contact with the fishing line. FIG. 3 and FIG. 6 shows that line griping surface 28 has a stop surface 28c, line griping surface 28a has a stop surface 28b, line gripping surface 32 has a stop surface 32c and a stop surface 32b. Note, the undulating passage that the line remains in when held by the gripping surfaces. Thus, the stop surfaces prevents a person from accidentally forcing a straight edge knife blade into the fishing line which is held in an undulating mode.

In the present invention, the sinker 10 provides line centering capabilities through line centering surfaces 44, 46, which are spaced a distance "d" from the sinker center line L. The line centering surfaces can be spaced a distance "d" generally equal to half the thickness of the fishing line in order to ensure that the sinker 10 is centered on the line. With small diameter lines, the line centering surfaces 44, 46 can be placed on the geometric center defined by the sinker center line L without affecting the balance of the sinker 10.

The invention includes a method for making the one piece sinker 10 and a core blade punch 100 to produce the line accepting passage 20 in the sinker 10 in a single step.

The method for making a one piece sinker 10 attachable to a fishing line includes providing a slug (not shown) which is deformed into the shape of the fishing sinker 10 of the present invention by forcing a core blade punch into the slug located in a die which causes the slug to deform into the shape of the sinker 10 shown in FIG. 1.

FIG. 8 shows a perspective view of core blade punch 100, with the blade sized to extend the length of the blank of sinker 10. The core blade punch 100, which is shown in a perspective view in FIG. 8, is shown in a partial top view in FIG. 9.

Referring to FIG. 9 the core blade punch 100 includes a core blade 90 having a first rib 91 that extends from side to side of core blade 90 and a second rib 92 that is spaced from the first rib 90 and also extends from side to side of core blade 90. Core blade 90 extends lengthwise a distance L. Located between rib 91 and 92 is an intermediate section 93 having a protruding surface 93a on one face and a hollow mating surface 93b on the opposite side. Located in front of rib 91 is an end section 94 that generally decreases in width until terminating at apex end 94a with end section 94 including a protruding surface 94b and a mating surface 94c. Thus core blade 90 includes two sections of lesser width than the width W of the core blade 90 and it is these sections that will form the mating line engaging surfaces on each half of sinker 10.

One of the difficulties in using a core blade punch to form a sinker in a single pass is that the deformation of the material such as lead places a high stress on the core blade 90. Consequently, the core blade is subject to breakage, which requires replacement of the core blade. In the present invention the core blade 90 is provided with two lateral ribs 91 and 92 that extend to a maximum width W and two intermediate sections 93 and 94 that extend laterally a distance, which is less than W. It has been found that the core blade 90 containing lateral ribs prevent premature breakage of the core blade 90. Consequently, the core blade 90 can be used for one pass formation of a sinker for an extended period of time. At the same time the surfaces formed proximate each of the ribs can be used to form the mating surfaces on the interior of the fishing sinker with the mating surfaces extending only part way across the sinker.

In a preferred embodiment of the method of the present invention, the core blade punch 100 is forced sufficiently far into the supported blank of sinker 10 to form the line accepting passage 20 that extends from the sinker exterior surface 16 to beyond the center line L of the sinker 10. The core blade punch 100 is also designed so that forcing punch 100 into the supported sinker 10 produces a line accepting passage 20 having an elongated thumb slot 52 adjacent the second end of the sinker 10 for maintaining an opening to allow one to pry apart the first and second jaw and insert or free a fishing line from the line accepting passage 20. Additionally, the core blade punch 100 is also designed to form fishing line centering surfaces 44, 46 positioned at the first and second ends of the tension adjusting peripheral hinge 42.

The core blade punch 100 is then withdrawn from the formed line accepting passage 20 of the sinker 10, and the sinker 10 with line accepting passage 20 is removed from the support device [120] (not shown).

In the present method for making a one-piece sinker attachable to a fishing line one can form a fishing sinker by providing a blank of finger bendable non-resilient material, such as lead. By forcing an elongated core blade punch 100 having at least one transverse rib 91 partially into the supported blank to simultaneously form a line accepting passage 20 separating a first jaw 22 and a second jaw 24 with the passage extending from a first end to a second end of the blank, with at least one line gripping surface 28 on the first jaw 22 and at least one line gripping surface 32 on the second jaw 24, and an outer surface 16 of the blank into a sinker 10 having a first end 14 larger than a second end 12. By withdrawing the core blade punch 100 from the formed line accepting passage of the blank and removing the blank with line accepting passage therein from the support device to provide a ready to use fishing sinker 10. By including the step of forming at least a portion of the mating surfaces on jaw 22 and jaw 24 with a non-planar surface one creates nodal areas in a fishing line that extends trough the sinker 10.

The cold pressure formed sinker 10, which is shown in FIG. 1, has a first end 12 and a second end 14 with the first end of the pressure formed member 10 smaller than the second end. The pressure formed member 10 includes an exterior surface 16 smoothly converging from the second end 14 to the first end 12 to form a streamlined, outer truncated, cone shape.

FIG. 8 illustrates that the core blade punch 104 permits one to form a sinker in a single pass with an elongated member 90 having a first lateral region 93a for forming a line gripping surface and a second lateral region 93b for forming a line gripping surface mateable with the first line gripping surface. The elongated member including a first transverse rib 92 and a second transverse rib 91 extending transverse to the elongated member 90 with at least one rib having a width wider than a width of the first and second lateral region of the elongated member. As can be seen in FIG. 8 the first lateral region 93b has an undulating or curved surface and the second lateral region 93a also has an undulating or curved surface, which is mateable with the undulating surface of the first lateral region. In the embodiment shown the core blade punch 104 including a second lateral rib 91 with the second lateral rib spaced from the first lateral rib 92. In this embodiment the first lateral surface includes at least two lateral surfaces on each side for forming spaced apart line gripping surfaces. In order to limit the depth of the relief region in the sinker the core blade punch 104 includes a shoulder 104a and 104b on one side and a shoulder 104b and 104c on the opposite side (see FIG. 9) for forming the stop surface on sinker 10.

I claim:

1. A method for making a one-piece sinker attachable to a fishing line comprising:

providing a blank of finger bendable non-resilient material;

forcing an elongated core blade punch having at least one transverse rib partially into the blank to simultaneously form:

(a) a line accepting passage separating a first jaw and a second jaw with the passage extending from a first end to a second end of the blank (b) a line gripping surface on each of the first jaw and the second jaw; and (c) an outer surface of the blank into a sinker having a first end larger than a second end;

withdrawing the core blade punch from the formed line accepting passage of the blank; and removing the blank with line accepting passage therein to provide a ready to use fishing sinker.

2. The method according to claim 1 wherein forcing the core blade punch into the blank includes forming an undulating line accepting passage extending to a position beyond the center line of the sinker.

3. The method according to claim 1 wherein forcing the core blade punch into the blank to form a line accepting passage includes forming at least two line gripping surfaces on each jaw.

4. The method according to claim 1 wherein forcing the core blade punch into the blank to form a line accepting passage includes forming an elongated relief extending from a first end of the sinker to a second end of the sinker to allow one to pry apart the first jaw and second jaw and free a fishing line from the line accepting passage.

5. The method according to claim 1 wherein forcing the core blade punch into the blank for forming a line accepting passage includes forming fishing line centering surfaces positioned at a first and second end of a peripheral hinge and a stop surface positioned intermediate of the first and second end of the peripheral hinge.

6. The method according to claim 1 wherein the core blade punch has at least two transverse ribs extending proximate a recess to form spaced apart line gripping surfaces in the blank.

7. The method according to claim 6 wherein forcing the core blade punch into the blank to form a line accepting passage includes forming an elongated relief coextensive with the blank to form an elongated opening to enable a user to pry apart the first and second jaw and free a fishing line from the line accepting passage.

8. The method according to claim 7 wherein forcing the core blade punch into the blank to form a line accepting passage includes forming fishing line centering surfaces positioned at a first and second end of a peripheral hinge.

9. The method according to claim 8 including the step of forming at least a portion of the mating surfaces on said first jaw and said second jaw with a non-planar surface.

* * * * *